(12) United States Patent
Krog

(10) Patent No.: US 8,731,870 B2
(45) Date of Patent: May 20, 2014

(54) METHOD OF DESIGNING A COMPOSITE PANEL

(75) Inventor: Lars Krog, Bristol (GB)

(73) Assignee: Airbus Operations Limited, Bristol (GB)

( * ) Notice: Subject to any disclaimer, the term of this patent is extended or adjusted under 35 U.S.C. 154(b) by 571 days.

(21) Appl. No.: 12/736,156

(22) PCT Filed: Apr. 14, 2009

(86) PCT No.: PCT/GB2009/050360
§ 371 (c)(1),
(2), (4) Date: Sep. 16, 2010

(87) PCT Pub. No.: WO2009/133382
PCT Pub. Date: Nov. 5, 2009

(65) Prior Publication Data
US 2011/0004451 A1 Jan. 6, 2011

(30) Foreign Application Priority Data
Apr. 28, 2008 (GB) .................... 0807643.2

(51) Int. Cl.
| | | |
|---|---|---|
| G06F 17/50 | (2006.01) | |
| G06F 19/00 | (2011.01) | |
| B64C 1/00 | (2006.01) | |
| B64C 30/00 | (2006.01) | |
| B64C 3/20 | (2006.01) | |
| B64C 3/26 | (2006.01) | |
| B64C 1/12 | (2006.01) | |
| B64C 1/26 | (2006.01) | |
| B64C 3/00 | (2006.01) | |

(52) U.S. Cl.
CPC ... *B64C 3/20* (2013.01); *B64C 3/26* (2013.01); *B64C 1/00* (2013.01); *B64C 1/12* (2013.01); *B64C 1/26* (2013.01); *B64C 3/00* (2013.01)
USPC .............. 703/1; 700/98; 244/117 R

(58) Field of Classification Search
CPC .............. B64C 1/00; B64C 1/12; B64C 1/26; B64C 3/00; B64C 3/20; B64C 3/26
USPC ........ 703/2, 1, 7; 244/117 R; 156/60; 428/95; 700/98
See application file for complete search history.

(56) References Cited

U.S. PATENT DOCUMENTS

| | | |
|---|---|---|
| 5,984,511 A | 11/1999 | Vasey-Glandon et al. |
| 2005/0163975 A1* | 7/2005 | Chen et al. .................... 428/192 |
| 2006/0029807 A1 | 2/2006 | Peck |
| 2007/0244590 A1* | 10/2007 | Menayo et al. .................. 700/98 |
| 2009/0022945 A1* | 1/2009 | Carpentier et al. ............ 428/119 |

FOREIGN PATENT DOCUMENTS

| | | |
|---|---|---|
| EP | 1 003 113 | 5/2000 |
| EP | 1 840 775 | 10/2007 |

OTHER PUBLICATIONS

Adams, David B. et al., "Optimization and Blending of Composite Laminates Using Genetic Algorithms with Migration", 2003, Mechanics of Advanced Materials and Structures, 10, Taylor & Francis Inc.*
International Search Report for PCT/GB2009/050360, mailed Oct. 12, 2009.
Written Opinion for PCT/GB2009/050360, mailed Oct. 12, 2009.
Search Report for GB 0807643.2 dated Aug. 22, 2008.
Adams et al., "Optimization and Blending of Composite Laminates Using Genetic Algorithms with Migration", *Mechanics of Advanced Materials and Structures*, vol. 10, Jul. 1, 2003, pp. 183-203.

* cited by examiner

*Primary Examiner* — Kakali Chaki
*Assistant Examiner* — Cedric D Johnson
(74) *Attorney, Agent, or Firm* — Nixon & Vanderhye P.C.

(57) ABSTRACT

A method of designing a composite panel, the panel comprising a plurality of zones, each zone comprising a plurality of plies of composite material arranged in a stacking sequence, each ply in each stacking sequence having a respective orientation angle. For each orientation angle a first layout matrix is created which identifies zones in the panel which contain at least one ply with that orientation angle. A second layout matrix is also created which identifies zones in the panel which contain at least two plies with that orientation angle, and so on up to an Nth layout matrix which identifies zones in the panel which contain at least N plies with that orientation angle. The layout matrices are arranged in a plurality of candidate sequences. Selection criteria are then used to choose one or more of the candidate sequences and stacking sequences are assigned to the zones in accordance with the chosen candidate sequence(s).

8 Claims, 1 Drawing Sheet

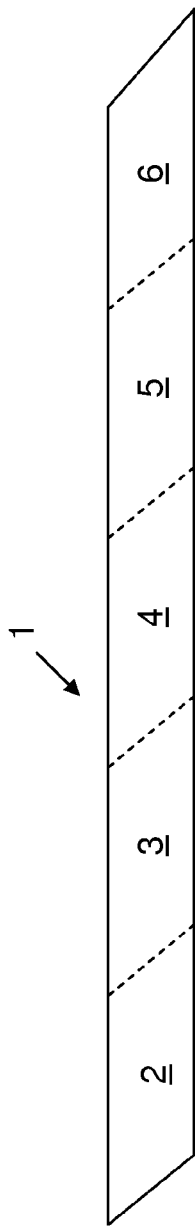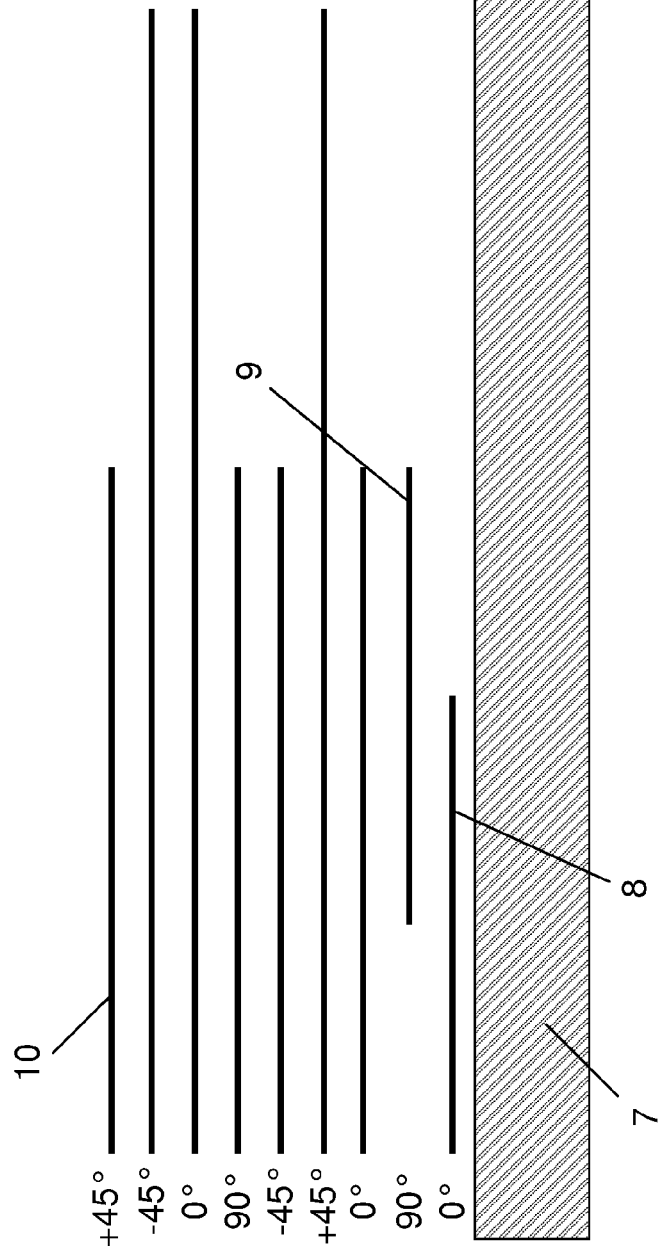

METHOD OF DESIGNING A COMPOSITE PANEL

This application is the U.S. national phase of International Application No. PCT/GB2009/050360 filed 14 Apr. 2009 which designated the U.S. and claims priority to GB Patent Application No. 0807643.2 filed 28 Apr. 2008, the entire contents of each of which are hereby incorporated by reference.

FIELD OF THE INVENTION

The present invention relates to a method of designing a composite panel, the panel comprising a plurality of zones, each zone comprising a plurality of plies of composite material arranged in a stacking sequence, each ply in each stacking sequence having a respective orientation angle.

BACKGROUND OF THE INVENTION

Typically such composite panels are constructed by stacking plies with different orientations. At any point in the panel a "ply percentage" can be defined, indicating the percentage of plies with a given orientation (or equivalently, volume fractions can be defined indicating the volume of plies with a given orientation). It is desirable to design such a composite panel with variable laminate ply percentages across the panel. However, starting with a laminate thickness/percentage formulation it is difficult to design a set of stacking sequences and ply layouts that fulfil both global ply continuity requirements and local stacking sequence design rules.

Typically the transformation from a laminate thickness/percentage formulation to a stacking sequence formulation has been performed using stacking sequence tables. A stacking sequence table describes a unique stacking sequence for each discrete laminate thickness. The laminate stacking sequence table is designed to satisfy both global ply continuity rules for increasing/decreasing laminate thickness and also local stacking sequence design rules. Typically the stacking sequence table is also constructed to have constant laminate ply percentages for all thickness values.

In optimisation runs with constant laminate ply percentages, the use of a laminate stacking sequence table makes it very easy to transform a percentage solution into a stacking sequence solution.

A simplified method of designing the panel is to initially work with thicknesses and laminate percentages and then later convert them into stacking sequences. This allows optimisation by numerical methods. However, for optimisation of a design with variable laminate percentages across the panel such a stacking sequence approach is not sufficient. An efficient method is therefore required to convert a laminate percentage solution into a stacking sequence solution.

Genetic algorithms (GA) for laminate stacking sequence optimisation would initially seem to offer a solution to the stacking sequence identification problem. However consider that it is necessary to identify individual stacking sequences for panels (such as aircraft wing covers) with say 500 individual zones. For an optimised design each zone could have a different thickness and different laminate percentage. A conventional genetic algorithm approach to stacking sequence optimisation would optimise the stacking sequence in each zone and try to satisfy both inter-zone ply continuity requirements and local stacking sequence rules.

Assume for a moment that each zone has 10 plies. The total number of possible stacking sequence permutations considering just a single zone equals $10!=3,628,800$. Next consider the problem of designing just two neighbouring zones. The number of design permutations considering individual stacking sequences in the two neighbouring zones is now $(10!)^2=13,168,189,440,000$. Now, imagine expanding this to consider all possible design permutations for 500 zones, so $(10!)^{500}$.

A genetic algorithm works by considering a population of discrete design configuration and refines this population by a systematic search using ideas from evolution theory. For the above problem clearly a genetic algorithm will only ever be able to cover a fraction of the total design space. A straightforward genetic algorithm approach with inter-zone constraints is therefore not thought to be a feasible option.

SUMMARY OF THE INVENTION

A first aspect of the invention provides a method of designing a composite panel, the panel comprising a plurality of zones, each zone comprising a plurality of plies of composite material arranged in a stacking sequence, each ply in each stacking sequence having a respective orientation angle, the method comprising:
  a. for each orientation angle:
     creating N layout matrices, where $N \geq 1$ and N is the highest number of plies with that orientation angle in any one zone of the panel, and the layout matrices are consecutively numbered 1, . . . n, . . . N, wherein
     i. the first layout matrix identifies zones in the panel which contain at least one ply with that orientation angle;
     ii. the nth layout matrix identifies zones in the panel which contain at least n plies with that orientation angle;
     iii. and the Nth layout matrix identifies zones in the panel which contain N plies with that orientation angle;
  b. arranging the layout matrices in a plurality of candidate sequences;
  c. using selection criteria to choose one or more of the candidate sequences; and
  d. assigning stacking sequences to the zones in accordance with the chosen candidate sequence(s).

In some situations it may be beneficial to split a layout matrix into several sub-matrices, for instance if the layout matrix has regions of zones which are not connected. In this case the method further comprising splitting at least one of the layout matrices into two or more sub-matrices, and arranging the sub-matrices along with the other matrices in the candidate sequences in step b.

Typically step c. is performed by a genetic algorithm which may for instance rank a population of candidate sequences according to a fitness measure, choose a sub-set of the population which ranks highly, and then update the population to improve its fitness measure.

In the example given below as a preferred embodiment, layout matrices are created for three orientation angles (0°, ±45° and 90°) and N has a value of three or more for each angle. However, in general the panel design may have any number of orientation angles. Also, some of the orientation angles may have low ply counts across the panel so that only one or two layout matrices are created for that orientation angle. Therefore some of the orientation angles may have only one layout matrix created, or in an extreme case (for a very thin panel) only one layout matrix is created per orientation angle.

A second aspect of the invention provides a method of manufacturing a composite panel, the method comprising designing the panel by the method of the first aspect of the invention; and assembling a plurality of plies of composite material in accordance with the chosen candidate layout sequence.

BRIEF DESCRIPTION OF THE DRAWINGS

Embodiments of the invention will now be described with reference to the drawings in which:

FIG. 1 is a perspective view of a composite panel with five zones; and

FIG. 2 is a sectional view through the panel showing the stacking sequences for the five zones of the panel.

DETAILED DESCRIPTION OF EMBODIMENT(S)

The starting point for the stacking sequence optimisation/ply design layout problem is laminate thickness distribution data and laminate percentage data. Tables 1-4 are matrices showing the output from a wing optimisation study, with simultaneous sizing optimisation and laminate percentage optimisation. Each cell in the matrix represents a zone in the wing cover. Table 1 identifies the total thickness of each zone in mm. Tables 2-4 show the volume fraction of 0° plies, ±45° plies and 90° plies respectively. As a first step towards determining a laminate stacking sequence and ply layout designs the continuous laminate optimisation data shown in Tables 1-4 is converted into a discrete solution in terms of number of plies. This involves:

Step 1: Converting laminate thickness/percentages into ply bundle thickness values. This task is easily achieved by simply multiplying the total laminate thickness and ply percentage values given in Tables 1-4.

Step 2: Converting continuous ply bundle thickness data into an integer number of plies. For this task the ply bundle thickness values are divided by the ply thickness value followed by a simple rounding to an integer number of plies. Several rounding schemes could be imagined. Tables 5-7 show the number of plies found, assuming a 1 mm ply thickness and using a simple round up scheme. It is noted that the simple round up scheme applied here does not provide an even number of plies for a symmetric design. For example Table 6 shows certain zones containing odd numbers of plies (that is, three or five plies). In the case where a zone in Tables 6 shows an even number (E) of plies then in the final stacking sequence there will be (E/2)+45° plies and (E/2)−45° plies. In the case where a zone in Tables 6 shows an odd number of plies then in the final stacking sequence the +45° plies and −45° plies will be apportioned as required—for instance two +45° plies and three −45° plies. Alternatively a different rounding scheme may be used to force Table 6 (and optionally also Tables 5 and 7) to give only even numbers.

Step 3: Ply count plots from Tables 5-7 are turned into ply layout matrices. Each ply layout matrix identifies zones in the panel, for a given ply direction, which contain at least 1 ply, 2 plies etc. Tables 8-15 shows ply layout matrices for the 0° plies, derived from Table 5. Equivalent layout matrices (not shown) are also produced for the 45° and 90° plies from the data in Tables 6 and 7 respectively. The layout matrices shown in Tables 8-15 are also described below as "layout cards" since they are effectively "shuffled" to arrive at an optimum design. Note that the ply counts of Tables 5-7 translate into eight layout cards for the 0° plies, six layout cards for the +/−45° plies, and three layout cards for the 90° plies.

However, for other designs there may be some ply directions with lower ply counts which translate into only one or two layout cards.

Having determined these ply layout matrices, designing a stacking sequence table becomes a simple task of deciding the stacking sequence for the layout matrices. Using the layout matrices automatically guarantees the global continuity of plies. What remains to be checked is that local stacking sequence rules are satisfied. This check must be done for each zone. A simple permutation GA can determine the optimum stacking sequence of the layout matrices.

Consider for a moment a panel with 500 individual zones, each zone having 10 plies. Using a conventional GA approach with inter-panel continuity constraints it is necessary to optimise within a design space with (4^10)^500 potential designs (assuming that there are four candidate ply orientations). By converting the problem into a problem of finding an optimal stacking sequence for a limited number of ply layout matrices the design space is reduced to include in the order of 10! designs. At the same time it is not necessary to deal with any inter-zone ply continuity constraints. Clearly this represents a tremendous reduction in complexity and makes optimisation by GAs possible.

Table 16 shows layout matrices for a simple example: a nine-layered 0°/±45°/90° laminate panel 1 with five zones 2-6 arranged in a line as shown in FIG. 1. By choosing a given sequence of the layout matrices (which are labelled Card#1, Card #2 etc in Table 16) the stacking sequence for each of the five zones covered by the ply layout matrices is defined. Table 17 shows a set of stacking sequences for the card sequence: #5#6 #1#8 #7#4 #2#9 #3.

FIG. 2 shows how the candidate sequence of Table 17 can be used to manufacture the composite panel 1. The panel 1 comprises five zones 2-6 which are formed by laying out nine plies of prepreg onto a layout table 7 as shown in FIG. 2. That is, the first ply 8 is a 0° ply (that is, with the carbon fibres running parallel to the axis of the panel 1) running along two zones 2,3; the second ply 9 is a 90° ply running along two zones 3,4, and so on until the top ply 10 which is a +45° ply (that is, with the carbon fibres running at +45° to the axis of the panel 1) running along zones 2-4.

A permutation GA is used to arrange the layout cards in a plurality of candidate sequences. For instance one of the candidate sequences may have the layout cards as shown in Table 17, another may have the layout cards arranged in another sequence such as #6#5 #1#8 #2#4 #7#3 #9, and so on. The GA then tests this population of candidate sequences against various selection criteria which determine a "fitness" for each candidate.

These selection criteria may include local stacking sequence rules such as:

1) Outer plies should be ±45° plies
2) No more than x plies of a certain direction can be direct neighbors
3) Plies should be distributed to avoid bending/torsion coupling effects
4) Others and/or structural rules such as "maximize the stiffness of the panel".

The GA seeks an improved sequence by studying the population of candidate layout matrix sequences, ranking these according to "fitness", and then using a system approach to update the population and improve the population "fitness". A permutation GA will do this optimization by interchange of existing plies only so will not introduce any new plies. The term "fitness" is a measure of how well the design rules set forward are fulfilled. Typically the GA would be asked to minimize some kind of an objective function. This objective function would be some kind of measure of the sum of violation of the design rules in each of the zones considered in the layout optimization problem.

Although the invention has been described above with reference to one or more preferred embodiments, it will be appreciated that various changes or modifications may be made without departing from the scope of the invention as defined in the appended claims.

TABLE 1 laminate thickness per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 9.84 | 9.84 | 10.38 | 10.38 | 11.66 | 11.66 | 6.37 |
| 1-2 | | | | 10.38 | 11.66 | | |
| 2-3 | | 6.03 | 5.22 | 5.22 | 6.73 | 6.73 | 6.58 |
| 3-4 | 6.03 | 6.03 | 5.22 | 5.22 | 6.73 | 6.73 | 6.58 |
| 4-5 | 6.62 | 6.62 | 5.72 | 5.72 | 6.65 | 6.65 | 7.61 |
| 5-6 | 6.62 | 6.62 | 5.72 | 5.72 | 6.65 | 6.65 | 7.61 |
| 6-7 | 7.04 | 7.04 | 5.76 | 5.76 | 8.55 | 8.55 | 9.52 |
| 7-8 | 7.04 | 7.04 | 5.76 | 5.76 | 8.55 | 8.55 | 9.52 |
| 8-9 | 8.20 | 8.20 | 9.54 | 9.54 | 12.45 | 12.45 | 13.87 |
| 9-10 | 8.20 | 8.20 | 9.54 | 9.54 | 12.45 | 12.45 | 13.87 |
| 10-11 | 9.51 | 9.51 | 11.72 | 11.72 | 11.80 | 11.80 | 13.02 |
| 11-12 | 9.51 | 9.51 | 11.72 | 11.72 | 11.80 | 11.80 | 13.02 |
| 12-13 | 9.40 | 9.40 | 10.33 | 10.33 | 11.44 | 11.44 | 12.90 |
| 13-14 | 9.40 | 9.40 | 10.33 | 10.33 | 11.44 | 11.44 | 12.90 |
| 14-15 | 9.98 | 9.98 | 9.19 | 9.19 | 10.00 | 10.00 | 9.70 |
| 15-16 | 9.98 | 9.98 | 9.19 | 9.19 | 10.00 | 10.00 | 9.70 |
| 16-17 | 9.70 | 9.70 | 8.34 | 8.34 | 9.28 | | |
| 17-18 | 9.70 | 9.70 | 8.34 | | | | |
| 18-19 | 10.79 | | | | | | |
| j-RS | 10.79 | 10.79 | 11.53 | 11.53 | 9.28 | 9.28 | 12.13 |

TABLE 2 volume fraction 0 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 0.44 | 0.44 | 0.42 | 0.42 | 0.38 | 0.38 | 0.32 |
| 1-2 | | | | 0.42 | 0.38 | | |
| 2-3 | | 0.44 | 0.36 | 0.36 | 0.33 | 0.33 | 0.34 |
| 3-4 | 0.44 | 0.44 | 0.36 | 0.36 | 0.33 | 0.33 | 0.34 |
| 4-5 | 0.44 | 0.44 | 0.35 | 0.35 | 0.32 | 0.32 | 0.35 |
| 5-6 | 0.44 | 0.44 | 0.35 | 0.35 | 0.32 | 0.32 | 0.35 |
| 6-7 | 0.44 | 0.44 | 0.35 | 0.35 | 0.37 | 0.37 | 0.42 |
| 7-8 | 0.44 | 0.44 | 0.35 | 0.35 | 0.37 | 0.37 | 0.42 |
| 8-9 | 0.44 | 0.44 | 0.39 | 0.39 | 0.45 | 0.45 | 0.51 |
| 9-10 | 0.44 | 0.44 | 0.39 | 0.39 | 0.45 | 0.45 | 0.51 |
| 10-11 | 0.44 | 0.44 | 0.43 | 0.43 | 0.42 | 0.42 | 0.48 |
| 11-12 | 0.44 | 0.44 | 0.43 | 0.43 | 0.42 | 0.42 | 0.48 |
| 12-13 | 0.44 | 0.44 | 0.41 | 0.41 | 0.43 | 0.43 | 0.48 |
| 13-14 | 0.44 | 0.44 | 0.41 | 0.41 | 0.43 | 0.43 | 0.48 |
| 14-15 | 0.44 | 0.44 | 0.39 | 0.39 | 0.36 | 0.36 | 0.38 |
| 15-16 | 0.44 | 0.44 | 0.39 | 0.39 | 0.36 | 0.36 | 0.38 |
| 16-17 | 0.44 | 0.44 | 0.36 | 0.36 | 0.33 | | |
| 17-18 | 0.44 | 0.44 | 0.36 | | | | |
| 18-19 | 0.44 | | | | | | |
| j-RS | 0.44 | 0.44 | 0.41 | 0.41 | 0.33 | 0.33 | 0.39 |

TABLE 3 volume fraction +/−45 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 0.45 | 0.45 | 0.46 | 0.46 | 0.44 | 0.44 | 0.50 |
| 1-2 | | | | 0.46 | 0.44 | | |
| 2-3 | | | 0.45 | 0.51 | 0.51 | 0.49 | 0.49 | 0.49 |
| 3-4 | 0.45 | 0.45 | 0.51 | 0.51 | 0.49 | 0.49 | 0.49 |
| 4-5 | 0.45 | 0.45 | 0.52 | 0.52 | 0.50 | 0.50 | 0.49 |
| 5-6 | 0.45 | 0.45 | 0.52 | 0.52 | 0.50 | 0.50 | 0.49 |
| 6-7 | 0.45 | 0.45 | 0.54 | 0.54 | 0.46 | 0.46 | 0.43 |
| 7-8 | 0.45 | 0.45 | 0.54 | 0.54 | 0.46 | 0.46 | 0.43 |
| 8-9 | 0.45 | 0.45 | 0.44 | 0.44 | 0.38 | 0.38 | 0.34 |
| 9-10 | 0.45 | 0.45 | 0.44 | 0.44 | 0.38 | 0.38 | 0.34 |
| 10-11 | 0.45 | 0.45 | 0.40 | 0.40 | 0.40 | 0.40 | 0.36 |
| 11-12 | 0.45 | 0.45 | 0.40 | 0.40 | 0.40 | 0.40 | 0.36 |
| 12-13 | 0.45 | 0.45 | 0.45 | 0.45 | 0.41 | 0.41 | 0.37 |
| 13-14 | 0.45 | 0.45 | 0.45 | 0.45 | 0.41 | 0.41 | 0.37 |
| 14-15 | 0.45 | 0.45 | 0.49 | 0.49 | 0.47 | 0.47 | 0.49 |
| 15-16 | 0.45 | 0.45 | 0.49 | 0.49 | 0.47 | 0.47 | 0.49 |
| 16-17 | 0.45 | 0.45 | 0.52 | 0.52 | 0.51 | | |
| 17-18 | 0.45 | 0.45 | 0.52 | 1.00 | | | |
| 18-19 | 0.45 | | | | | | |
| j-RS | 0.45 | 0.45 | 0.42 | 0.42 | 0.51 | 0.51 | 0.47 |

TABLE 4 volume fraction 90 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 0.11 | 0.11 | 0.12 | 0.12 | 0.19 | 0.19 | 0.18 |
| 1-2 | | | | 0.12 | 0.19 | | |
| 2-3 | | 0.11 | 0.13 | 0.13 | 0.18 | 0.18 | 0.17 |
| 3-4 | 0.11 | 0.11 | 0.13 | 0.13 | 0.18 | 0.18 | 0.17 |
| 4-5 | 0.11 | 0.11 | 0.13 | 0.13 | 0.18 | 0.18 | 0.16 |
| 5-6 | 0.11 | 0.11 | 0.13 | 0.13 | 0.18 | 0.18 | 0.16 |
| 6-7 | 0.11 | 0.11 | 0.11 | 0.11 | 0.16 | 0.16 | 0.15 |
| 7-8 | 0.11 | 0.11 | 0.11 | 0.11 | 0.16 | 0.16 | 0.15 |
| 8-9 | 0.11 | 0.11 | 0.17 | 0.17 | 0.17 | 0.17 | 0.15 |
| 9-10 | 0.11 | 0.11 | 0.17 | 0.17 | 0.17 | 0.17 | 0.15 |
| 10-11 | 0.11 | 0.11 | 0.18 | 0.18 | 0.18 | 0.18 | 0.16 |
| 11-12 | 0.11 | 0.11 | 0.18 | 0.18 | 0.18 | 0.18 | 0.16 |
| 12-13 | 0.11 | 0.11 | 0.14 | 0.14 | 0.16 | 0.16 | 0.15 |
| 13-14 | 0.11 | 0.11 | 0.14 | 0.14 | 0.16 | 0.16 | 0.15 |
| 14-15 | 0.11 | 0.11 | 0.12 | 0.12 | 0.16 | 0.16 | 0.13 |
| 15-16 | 0.11 | 0.11 | 0.12 | 0.12 | 0.16 | 0.16 | 0.13 |
| 16-17 | 0.11 | 0.11 | 0.11 | 0.11 | 0.16 | | |
| 17-18 | 0.11 | 0.11 | 0.11 | | | | |
| 18-19 | 0.11 | | | | | | |
| j-RS | 0.11 | 0.11 | 0.16 | 0.16 | 0.16 | 0.16 | 0.13 |

TABLE 5 number of 0 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 5.00 | 5.00 | 5.00 | 5.00 | 5.00 | 5.00 | 3.00 |
| 1-2 | 0.00 | 0.00 | 0.00 | 5.00 | 5.00 | 0.00 | 0.00 |
| 2-3 | 0.00 | 3.00 | 2.00 | 2.00 | 3.00 | 3.00 | 3.00 |
| 3-4 | 3.00 | 3.00 | 2.00 | 2.00 | 3.00 | 3.00 | 3.00 |
| 4-5 | 3.00 | 3.00 | 3.00 | 3.00 | 3.00 | 3.00 | 3.00 |
| 5-6 | 3.00 | 3.00 | 3.00 | 3.00 | 3.00 | 3.00 | 3.00 |
| 6-7 | 4.00 | 4.00 | 3.00 | 3.00 | 4.00 | 4.00 | 5.00 |
| 7-8 | 4.00 | 4.00 | 3.00 | 3.00 | 4.00 | 4.00 | 5.00 |
| 8-9 | 4.00 | 4.00 | 4.00 | 4.00 | 6.00 | 6.00 | 8.00 |
| 9-10 | 4.00 | 4.00 | 4.00 | 4.00 | 6.00 | 6.00 | 8.00 |
| 10-11 | 5.00 | 5.00 | 5.00 | 5.00 | 5.00 | 5.00 | 7.00 |

TABLE 5-continued number of 0 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| 11-12 | 5.00 | 5.00 | 5.00 | 5.00 | 5.00 | 5.00 | 7.00 |
| 12-13 | 5.00 | 5.00 | 5.00 | 5.00 | 5.00 | 5.00 | 7.00 |
| 13-14 | 5.00 | 5.00 | 5.00 | 5.00 | 5.00 | 5.00 | 7.00 |
| 14-15 | 5.00 | 5.00 | 4.00 | 4.00 | 4.00 | 4.00 | 4.00 |
| 15-16 | 5.00 | 5.00 | 4.00 | 4.00 | 4.00 | 4.00 | 4.00 |
| 16-17 | 5.00 | 5.00 | 4.00 | 4.00 | 4.00 | 0.00 | 0.00 |
| 17-18 | 5.00 | 5.00 | 4.00 | 0.00 | 0.00 | 0.00 | 0.00 |
| 18-19 | 5.00 | 0.00 | 0.00 | 0.00 | 0.00 | 0.00 | 0.00 |
| j-RS | 5.00 | 5.00 | 5.00 | 5.00 | 4.00 | 4.00 | 5.00 |

TABLE 6 number of +/−45 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 5.00 | 5.00 | 5.00 | 5.00 | 6.00 | 6.00 | 4.00 |
| 1-2 | 0.00 | 0.00 | 0.00 | 5.00 | 6.00 | 0.00 | 0.00 |
| 2-3 | 0.00 | 3.00 | 3.00 | 3.00 | 4.00 | 4.00 | 4.00 |
| 3-4 | 3.00 | 3.00 | 3.00 | 3.00 | 4.00 | 4.00 | 4.00 |
| 4-5 | 3.00 | 3.00 | 3.00 | 3.00 | 4.00 | 4.00 | 4.00 |
| 5-6 | 3.00 | 3.00 | 3.00 | 3.00 | 4.00 | 4.00 | 4.00 |
| 6-7 | 4.00 | 4.00 | 4.00 | 4.00 | 4.00 | 4.00 | 5.00 |
| 7-8 | 4.00 | 4.00 | 4.00 | 4.00 | 4.00 | 4.00 | 5.00 |
| 8-9 | 4.00 | 4.00 | 5.00 | 5.00 | 5.00 | 5.00 | 5.00 |
| 9-10 | 4.00 | 4.00 | 5.00 | 5.00 | 5.00 | 5.00 | 5.00 |
| 10-11 | 5.00 | 5.00 | 5.00 | 5.00 | 5.00 | 5.00 | 5.00 |
| 11-12 | 5.00 | 5.00 | 5.00 | 5.00 | 5.00 | 5.00 | 5.00 |
| 12-13 | 5.00 | 5.00 | 5.00 | 5.00 | 5.00 | 5.00 | 5.00 |
| 13-14 | 5.00 | 5.00 | 5.00 | 5.00 | 5.00 | 5.00 | 5.00 |
| 14-15 | 5.00 | 5.00 | 5.00 | 5.00 | 5.00 | 5.00 | 5.00 |
| 15-16 | 5.00 | 5.00 | 5.00 | 5.00 | 5.00 | 5.00 | 5.00 |
| 16-17 | 5.00 | 5.00 | 5.00 | 5.00 | 5.00 | 0.00 | 0.00 |
| 17-18 | 5.00 | 5.00 | 5.00 | 0.00 | 0.00 | 0.00 | 0.00 |
| 18-19 | 5.00 | 0.00 | 0.00 | 0.00 | 0.00 | 0.00 | 0.00 |
| j-RS | 5.00 | 5.00 | 5.00 | 5.00 | 5.00 | 5.00 | 6.00 |

TABLE 7 number of 90 degree plies per zone

| Stringers | Ribs | | | | | | |
|---|---|---|---|---|---|---|---|
| | 2-3 | 3-4 | 4-5 | 5-6 | 6-7 | 7-8 | 8-9 |
| FS-i | 2.00 | 2.00 | 2.00 | 2.00 | 3.00 | 3.00 | 2.00 |
| 1-2 | 0.00 | 0.00 | 0.00 | 2.00 | 3.00 | 0.00 | 0.00 |
| 2-3 | 0.00 | 1.00 | 1.00 | 1.00 | 2.00 | 2.00 | 2.00 |
| 3-4 | 1.00 | 1.00 | 1.00 | 1.00 | 2.00 | 2.00 | 2.00 |
| 4-5 | 1.00 | 1.00 | 1.00 | 1.00 | 2.00 | 2.00 | 2.00 |
| 5-6 | 1.00 | 1.00 | 1.00 | 1.00 | 2.00 | 2.00 | 2.00 |
| 6-7 | 1.00 | 1.00 | 1.00 | 1.00 | 2.00 | 2.00 | 2.00 |
| 7-8 | 1.00 | 1.00 | 1.00 | 1.00 | 2.00 | 2.00 | 2.00 |
| 8-9 | 1.00 | 1.00 | 2.00 | 2.00 | 3.00 | 3.00 | 3.00 |
| 9-10 | 1.00 | 1.00 | 2.00 | 2.00 | 3.00 | 3.00 | 3.00 |
| 10-11 | 2.00 | 2.00 | 3.00 | 3.00 | 3.00 | 3.00 | 3.00 |
| 11-12 | 2.00 | 2.00 | 3.00 | 3.00 | 3.00 | 3.00 | 3.00 |
| 12-13 | 2.00 | 2.00 | 2.00 | 2.00 | 2.00 | 2.00 | 2.00 |
| 13-14 | 2.00 | 2.00 | 2.00 | 2.00 | 2.00 | 2.00 | 2.00 |
| 14-15 | 2.00 | 2.00 | 2.00 | 2.00 | 2.00 | 2.00 | 2.00 |
| 15-16 | 2.00 | 2.00 | 2.00 | 2.00 | 2.00 | 2.00 | 2.00 |
| 16-17 | 2.00 | 2.00 | 2.00 | 2.00 | 1.00 | 0.00 | 0.00 |
| 17-18 | 2.00 | 2.00 | 1.00 | 0.00 | 0.00 | 0.00 | 0.00 |
| 18-19 | 2.00 | 0.00 | 0.00 | 0.00 | 0.00 | 0.00 | 0.00 |
| j-RS | 2.00 | 2.00 | 2.00 | 2.00 | 2.00 | 2.00 | 2.00 |

TABLE 8 layout matrix identifying zones which contain at least one zero degree ply

| Stringers | Ribs | | | | | | |
|---|---|---|---|---|---|---|---|
| | 2-3 | 3-4 | 4-5 | 5-6 | 6-7 | 7-8 | 8-9 |
| FS-i | 1.00 | 1.00 | 1.00 | 1.00 | 1.00 | 1.00 | 1.00 |
| 1-2 | | | | 1.00 | 1.00 | | |
| 2-3 | | 1.00 | 1.00 | 1.00 | 1.00 | 1.00 | 1.00 |
| 3-4 | 1.00 | 1.00 | 1.00 | 1.00 | 1.00 | 1.00 | 1.00 |
| 4-5 | 1.00 | 1.00 | 1.00 | 1.00 | 1.00 | 1.00 | 1.00 |
| 5-6 | 1.00 | 1.00 | 1.00 | 1.00 | 1.00 | 1.00 | 1.00 |
| 6-7 | 1.00 | 1.00 | 1.00 | 1.00 | 1.00 | 1.00 | 1.00 |
| 7-8 | 1.00 | 1.00 | 1.00 | 1.00 | 1.00 | 1.00 | 1.00 |
| 8-9 | 1.00 | 1.00 | 1.00 | 1.00 | 1.00 | 1.00 | 1.00 |
| 9-10 | 1.00 | 1.00 | 1.00 | 1.00 | 1.00 | 1.00 | 1.00 |
| 10-11 | 1.00 | 1.00 | 1.00 | 1.00 | 1.00 | 1.00 | 1.00 |
| 11-12 | 1.00 | 1.00 | 1.00 | 1.00 | 1.00 | 1.00 | 1.00 |
| 12-13 | 1.00 | 1.00 | 1.00 | 1.00 | 1.00 | 1.00 | 1.00 |
| 13-14 | 1.00 | 1.00 | 1.00 | 1.00 | 1.00 | 1.00 | 1.00 |
| 14-15 | 1.00 | 1.00 | 1.00 | 1.00 | 1.00 | 1.00 | 1.00 |
| 15-16 | 1.00 | 1.00 | 1.00 | 1.00 | 1.00 | 1.00 | 1.00 |
| 16-17 | 1.00 | 1.00 | 1.00 | 1.00 | 1.00 | | |
| 17-18 | 1.00 | 1.00 | 1.00 | | | | |
| 18-19 | 1.00 | | | | | | |
| j-RS | 1.00 | 1.00 | 1.00 | 1.00 | 1.00 | 1.00 | 1.00 |

TABLE 9 layout matrix identifying zones which contain at least two zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | 2.00 | 2.00 | 2.00 | 2.00 | 2.00 | 2.00 | 2.00 |
| 1-2 | | | | 2.00 | 2.00 | | |
| 2-3 | | 2.00 | 2.00 | 2.00 | 2.00 | 2.00 | 2.00 |
| 3-4 | 2.00 | 2.00 | 2.00 | 2.00 | 2.00 | 2.00 | 2.00 |
| 4-5 | 2.00 | 2.00 | 2.00 | 2.00 | 2.00 | 2.00 | 2.00 |
| 5-6 | 2.00 | 2.00 | 2.00 | 2.00 | 2.00 | 2.00 | 2.00 |
| 6-7 | 2.00 | 2.00 | 2.00 | 2.00 | 2.00 | 2.00 | 2.00 |
| 7-8 | 2.00 | 2.00 | 2.00 | 2.00 | 2.00 | 2.00 | 2.00 |
| 8-9 | 2.00 | 2.00 | 2.00 | 2.00 | 2.00 | 2.00 | 2.00 |
| 9-10 | 2.00 | 2.00 | 2.00 | 2.00 | 2.00 | 2.00 | 2.00 |
| 10-11 | 2.00 | 2.00 | 2.00 | 2.00 | 2.00 | 2.00 | 2.00 |
| 11-12 | 2.00 | 2.00 | 2.00 | 2.00 | 2.00 | 2.00 | 2.00 |
| 12-13 | 2.00 | 2.00 | 2.00 | 2.00 | 2.00 | 2.00 | 2.00 |
| 13-14 | 2.00 | 2.00 | 2.00 | 2.00 | 2.00 | 2.00 | 2.00 |
| 14-15 | 2.00 | 2.00 | 2.00 | 2.00 | 2.00 | 2.00 | 2.00 |
| 15-16 | 2.00 | 2.00 | 2.00 | 2.00 | 2.00 | 2.00 | 2.00 |
| 16-17 | 2.00 | 2.00 | 2.00 | 2.00 | 2.00 | | |
| 17-18 | 2.00 | 2.00 | 2.00 | | | | |
| 18-19 | 2.00 | | | | | | |
| j-RS | 2.00 | 2.00 | 2.00 | 2.00 | 2.00 | 2.00 | 2.00 |

TABLE 10 layout matrix identifying zones which contain at least three zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | 3.00 | 3.00 | 3.00 | 3.00 | 3.00 | 3.00 | 3.00 |
| 1-2 | | | | 3.00 | 3.00 | | |
| 2-3 | | 3.00 | | | 3.00 | 3.00 | 3.00 |
| 3-4 | 3.00 | 3.00 | | | 3.00 | 3.00 | 3.00 |
| 4-5 | 3.00 | 3.00 | 3.00 | 3.00 | 3.00 | 3.00 | 3.00 |
| 5-6 | 3.00 | 3.00 | 3.00 | 3.00 | 3.00 | 3.00 | 3.00 |
| 6-7 | 3.00 | 3.00 | 3.00 | 3.00 | 3.00 | 3.00 | 3.00 |
| 7-8 | 3.00 | 3.00 | 3.00 | 3.00 | 3.00 | 3.00 | 3.00 |

TABLE 10-continued layout matrix identifying zones which contain at least three zero degree plies

| Stringers | Ribs | | | | | | |
|---|---|---|---|---|---|---|---|
| | 2-3 | 3-4 | 4-5 | 5-6 | 6-7 | 7-8 | 8-9 |
| 8-9 | 3.00 | 3.00 | 3.00 | 3.00 | 3.00 | 3.00 | 3.00 |
| 9-10 | 3.00 | 3.00 | 3.00 | 3.00 | 3.00 | 3.00 | 3.00 |
| 10-11 | 3.00 | 3.00 | 3.00 | 3.00 | 3.00 | 3.00 | 3.00 |
| 11-12 | 3.00 | 3.00 | 3.00 | 3.00 | 3.00 | 3.00 | 3.00 |
| 12-13 | 3.00 | 3.00 | 3.00 | 3.00 | 3.00 | 3.00 | 3.00 |
| 13-14 | 3.00 | 3.00 | 3.00 | 3.00 | 3.00 | 3.00 | 3.00 |
| 14-15 | 3.00 | 3.00 | 3.00 | 3.00 | 3.00 | 3.00 | 3.00 |
| 15-16 | 3.00 | 3.00 | 3.00 | 3.00 | 3.00 | 3.00 | |
| 16-17 | 3.00 | 3.00 | 3.00 | 3.00 | 3.00 | | |
| 17-18 | 3.00 | 3.00 | 3.00 | | | | |
| 18-19 | 3.00 | | | | | | |
| i-RS | 3.00 | 3.00 | 3.00 | 3.00 | 3.00 | 3.00 | 3.00 |

TABLE 11 layout matrix identifying zones which contain at least four zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | 4.00 | 4.00 | 4.00 | 4.00 | 4.00 | 4.00 | |
| 1-2 | | | | 4.00 | 4.00 | | |
| 2-3 | | | | | | | |
| 3-4 | | | | | | | |
| 4-5 | | | | | | | |
| 5-6 | | | | | | | |
| 6-7 | 4.00 | 4.00 | | | 4.00 | 4.00 | 4.00 |
| 7-8 | 4.00 | 4.00 | | 4.00 | 4.00 | 4.00 | 4.00 |
| 8-9 | 4.00 | 4.00 | 4.00 | 4.00 | 4.00 | 4.00 | 4.00 |
| 9-10 | 4.00 | 4.00 | 4.00 | 4.00 | 4.00 | 4.00 | 4.00 |
| 10-11 | 4.00 | 4.00 | 4.00 | 4.00 | 4.00 | 4.00 | 4.00 |
| 11-12 | 4.00 | 4.00 | 4.00 | 4.00 | 4.00 | 4.00 | 4.00 |
| 12-13 | 4.00 | 4.00 | 4.00 | 4.00 | 4.00 | 4.00 | 4.00 |
| 13-14 | 4.00 | 4.00 | 4.00 | 4.00 | 4.00 | 4.00 | 4.00 |
| 14-15 | 4.00 | 4.00 | 4.00 | 4.00 | 4.00 | 4.00 | 4.00 |
| 15-16 | 4.00 | 4.00 | 4.00 | 4.00 | 4.00 | 4.00 | 4.00 |
| 16-17 | 4.00 | 4.00 | 4.00 | 4.00 | 4.00 | | |
| 17-18 | 4.00 | 4.00 | 4.00 | | | | |
| 18-19 | 4.00 | | | | | | |
| j-RS | 4.00 | 4.00 | 4.00 | 4.00 | 4.00 | 4.00 | 4.00 |

TABLE 12 layout matrix identifying zones which contain at least five zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | 5.00 | 5.00 | 5.00 | 5.00 | 5.00 | 5.00 | |
| 1-2 | | | | 5.00 | 5.00 | | |
| 2-3 | | | | | | | |
| 3-4 | | | | | | | |
| 4-5 | | | | | | | |
| 5-6 | | | | | | | |
| 6-7 | | | | | | | 5.00 |
| 7-8 | | | | | | | 5.00 |
| 8-9 | | | | 5.00 | 5.00 | 5.00 | 5.00 |
| 9-10 | | | | | 5.00 | 5.00 | 5.00 |
| 10-11 | 5.00 | 5.00 | 5.00 | 5.00 | 5.00 | 5.00 | 5.00 |
| 11-12 | 5.00 | 5.00 | 5.00 | 5.00 | 5.00 | 5.00 | 5.00 |
| 12-13 | 5.00 | 5.00 | 5.00 | 5.00 | 5.00 | 5.00 | 5.00 |
| 13-14 | 5.00 | 5.00 | 5.00 | 5.00 | 5.00 | 5.00 | 5.00 |
| 14-15 | 5.00 | 5.00 | | | | | |
| 15-16 | 5.00 | 5.00 | | | | | |

TABLE 12-continued layout matrix identifying zones which contain at least five zero degree plies

| Stringers | Ribs | | | | | | |
|---|---|---|---|---|---|---|---|
| | 2-3 | 3-4 | 4-5 | 5-6 | 6-7 | 7-8 | 8-9 |
| 16-17 | 5.00 | 5.00 | | | | | |
| 17-18 | 5.00 | 5.00 | | | | | |
| 18-19 | 5.00 | | | | | | |
| j-RS | 5.00 | 5.00 | 5.00 | 5.00 | | | 5.00 |

TABLE 13 layout matrix identifying zones which contain at least six zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | | | | | | | |
| 1-2 | | | | | | | |
| 2-3 | | | | | | | |
| 3-4 | | | | | | | |
| 4-5 | | | | | | | |
| 5-6 | | | | | | | |
| 6-7 | | | | | | | |
| 7-8 | | | | | | | |
| 8-9 | | | | | 6.00 | 6.00 | 6.00 |
| 9-10 | | | | | 6.00 | 6.00 | 6.00 |
| 10-11 | | | | | | | 6.00 |
| 11-12 | | | | | | | 6.00 |
| 12-13 | | | | | | | 6.00 |
| 13-14 | | | | | | | 6.00 |
| 14-15 | | | | | | | |
| 15-16 | | | | | | | |
| 16-17 | | | | | | | |
| 17-18 | | | | | | | |
| 18-19 | | | | | | | |
| j-RS | | | | | | | |

TABLE 14 layout matrix identifying zones which contain at least seven zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | | | | | | | |
| 1-2 | | | | | | | |
| 2-3 | | | | | | | |
| 3-4 | | | | | | | |
| 4-5 | | | | | | | |
| 5-6 | | | | | | | |
| 6-7 | | | | | | | |
| 7-8 | | | | | | | |
| 8-9 | | | | | | | 7.00 |
| 9-10 | | | | | | | 7.00 |
| 10-11 | | | | | | | 7.00 |
| 11-12 | | | | | | | 7.00 |
| 12-13 | | | | | | | 7.00 |
| 13-14 | | | | | | | 7.00 |
| 14-15 | | | | | | | |
| 15-16 | | | | | | | |
| 16-17 | | | | | | | |
| 17-18 | | | | | | | |
| 18-19 | | | | | | | |
| j-RS | | | | | | | |

TABLE 15 layout matrix identifying zones which contain at least eight zero degree plies

| Stringers | Ribs | | | | | | |
|---|---|---|---|---|---|---|---|
| | 2-3 | 3-4 | 4-5 | 5-6 | 6-7 | 7-8 | 8-9 |
| FS-i | | | | | | | |
| 1-2 | | | | | | | |
| 2-3 | | | | | | | |
| 3-4 | | | | | | | |
| 4-5 | | | | | | | |
| 5-6 | | | | | | | |
| 6-7 | | | | | | | |
| 7-8 | | | | | | | |
| 8-9 | | | | | | | 8.00 |
| 9-10 | | | | | | | 8.00 |
| 10-11 | | | | | | | |
| 11-12 | | | | | | | |
| 12-13 | | | | | | | |
| 13-14 | | | | | | | |
| 14-15 | | | | | | | |
| 15-16 | | | | | | | |
| 16-17 | | | | | | | |
| 17-18 | | | | | | | |
| 18-19 | | | | | | | |
| j-RS | | | | | | | |

TABLE 16

Ply layout cards for 9-layered composite

| Card #1 | 0 | 0 | 0 | 0 | 0 |
|---|---|---|---|---|---|
| Card #2 | 0 | 0 | 0 | | |
| Card #3 | 0 | 0 | | | |
| Card #4 | +45 | +45 | +45 | +45 | +45 |
| Card #5 | +45 | +45 | +45 | | |
| Card #6 | −45 | −45 | −45 | −45 | −45 |
| Card #7 | −45 | −45 | −45 | | |
| Card #8 | 90 | 90 | 90 | 90 | 90 |
| Card #9 | | 90 | 90 | | |

TABLE 17

Stacking sequence and card sequence #5 #6 #1 #8 #7 #4 #2 #9 #3

| Card #5 | +45 | +45 | +45 | | |
|---|---|---|---|---|---|
| Card #6 | −45 | −45 | −45 | −45 | −45 |
| Card #1 | 0 | 0 | 0 | 0 | 0 |
| Card #8 | 90 | 90 | 90 | 90 | 90 |
| Card #7 | −45 | −45 | −45 | | |
| Card #4 | +45 | +45 | +45 | +45 | +45 |
| Card #2 | 0 | 0 | 0 | | |
| Card #9 | | 90 | 90 | | |
| Card #3 | 0 | 0 | | | |

The invention claimed is:

1. A method of designing a composite panel, the panel comprising a plurality of zones, each zone comprising a plurality of plies of composite material arranged in a stacking sequence, each ply in each stacking sequence having a respective orientation angle, the method comprising:
 a. for each orientation angle creating N layout matrices, where N≥1 and N is the highest number of plies with that orientation angle in any one zone of the panel, and the layout matrices are consecutively numbered 1, . . . n, . . . N, wherein
  i. the first layout matrix identifies zones in the panel which contain at least one ply with that orientation angle;
  ii. the nth layout matrix identifies zones in the panel which contain at least n plies with that orientation angle;
  iii. and the Nth layout matrix identifies zones in the panel which contain N plies with that orientation angle;
 b. arranging the layout matrices in a plurality of candidate sequences;
 c. using selection criteria to choose one or more of the candidate sequences; and
 d. assigning stacking sequences to the zones in accordance with the chosen candidate sequences, the above method steps are implemented on a computer.

2. The method of claim 1 wherein step c. is performed by a genetic algorithm.

3. The method of claim 2 wherein the genetic algorithm ranks a population of candidate sequences according to a fitness measure, chooses a sub-set of the population which ranks highly, and then updates the population to improve its fitness measure.

4. The method of claim 1 wherein the selection criteria include local stacking sequence rules.

5. The method of claim 1 further comprising splitting at least one of the layout matrices into two or more sub-matrices, and arranging the sub-matrices along with the other matrices in the candidate sequences in step b.

6. The method of claim 5 wherein the sub-matrices identify regions of zones which are not connected.

7. A method of manufacturing a composite panel, the method comprising designing the panel by the method of claim 1; and assembling a plurality of plies of composite material in accordance with the chosen candidate sequence.

8. The method of claim 7 wherein the panel comprises a plurality of zones, each zone comprising a plurality of plies of composite material arranged in a stacking sequence, each ply in each stacking sequence having reinforcement fibres which extend in a direction which defines the orientation angle of the ply.

* * * * *